United States Patent [19]

Delprato et al.

[11] Patent Number: 5,281,515
[45] Date of Patent: Jan. 25, 1994

[54] THERMALLY DEVELOPABLE PHOTOGRAPHIC ELEMENTS

[75] Inventors: Ivano Delprato, Rocchetta Di Cairo Montenotte; Stefano Mana, Fossano; Cristina Soncini, Savona, all of Italy

[73] Assignee: Minnesota Mining and Manufacturing Company, St. Paul, Minn.

[21] Appl. No.: 928,321

[22] Filed: Aug. 12, 1992

[30] Foreign Application Priority Data

Sep. 18, 1991 [IT] Italy ............................ MI91A002468

[51] Int. Cl.⁵ ...................... G03C 1/005; G03C 1/494; G03C 1/00
[52] U.S. Cl. ...................................... 430/577; 930/591; 930/617; 930/619
[58] Field of Search ............... 430/577, 578, 591, 617, 430/619

[56] References Cited

U.S. PATENT DOCUMENTS

| | | | |
|---|---|---|---|
| 3,180,731 | 4/1965 | Roman et al. | 96/29 |
| 3,457,075 | 7/1969 | Morgan et al. | 96/67 |
| 3,531,286 | 9/1970 | Renfew | 96/67 |
| 3,656,958 | 4/1972 | Depoorter et al. | 430/591 |
| 3,713,828 | 1/1973 | Hayashi et al. | 430/591 |
| 3,761,270 | 9/1973 | de Mauriac et al. | 96/77 |
| 3,761,279 | 9/1973 | de Mauriac et al. | 96/114.1 |
| 3,839,049 | 10/1974 | Simons | 96/114.6 |
| 3,846,136 | 11/1974 | Sullivan | 96/114.1 |
| 3,933,507 | 1/1976 | von Konig et al. | 96/114.1 |
| 3,994,732 | 11/1976 | Winslow | 96/114.1 |
| 4,021,249 | 5/1977 | Noguchi et al. | 96/114.1 |
| 4,022,617 | 5/1977 | McGuckin | 96/29 D |
| 4,460,681 | 7/1984 | Frenchik | 430/502 |
| 4,729,946 | 3/1988 | Kasama et al. | 430/591 |
| 4,769,316 | 9/1988 | Miyasaki et al. | 430/591 |
| 4,883,747 | 11/1989 | Grieve et al. | 430/542 |
| 5,229,262 | 7/1993 | Arai et al. | 430/577 |

FOREIGN PATENT DOCUMENTS

| | | | |
|---|---|---|---|
| 0738921 | 9/1969 | Belgium | 430/591 |
| 0631531 | 11/1961 | Canada | 430/577 |
| 2043943 | 3/1971 | Fed. Rep. of Germany | 430/591 |
| 0012373 | 4/1978 | Japan | 430/577 |
| 1172140 | 8/1986 | Japan | 430/577 |
| 1170937 | 7/1989 | Japan | 430/591 |
| 0182511 | 5/1966 | U.S.S.R. | 430/591 |
| 0245553 | 6/1969 | U.S.S.R. | 430/591 |
| 570609 | 8/1977 | U.S.S.R. | 430/591 |
| 1367417 | 9/1974 | United Kingdom . | |
| 1409009 | 10/1975 | United Kingdom . | |
| 1422057 | 1/1976 | United Kingdom | G03C 1/10 |
| 1466201 | 3/1977 | United Kingdom . | |
| 1570964 | 7/1980 | United Kingdom | 430/619 |
| 2111234 | 6/1983 | United Kingdom | 430/577 |

OTHER PUBLICATIONS

Research Disclosure 29963, Mar., 1989.

*Primary Examiner*—Lee C. Wright
*Assistant Examiner*—J. Pasterczyk
*Attorney, Agent, or Firm*—Gary L. Griswold; Walter N. Kirn; Mark A. Litman

[57] ABSTRACT

The addition of simple merocyanine spectral sensitizing dyes to silver halide photothermographic emulsions improves the stability of the emulsion during storage before heat processing.

8 Claims, No Drawings

THERMALLY DEVELOPABLE PHOTOGRAPHIC ELEMENTS

FIELD OF THE INVENTION

This invention relates to thermally developable photographic materials and in particular to stabilization of dry silver systems against fog increase and sensitivity decrease during storage before heat processing.

BACKGROUND OF THE ART

Silver halide thermally developable photographic elements, especially "dry silver" compositions, processed with heat and without liquid development have been known in the art for many years. Such elements generally are a mixture of light insensitive silver salt of an organic acid (e.g. silver behenate), a minor amount of catalytic light sensitive silver halide, and a reducing agent for the silver source.

The light sensitive silver halide is in catalytic proximity to the light insensitive silver salt such that the latent image (silver specks) formed by the irradiation of the silver halide serves as a catalyst nucleus for the oxidation-reduction reaction of the organic silver salt with the reducing agent when heated above 80° C. Such media are described in U.S. Pat. Nos. 3,457,075; 3,839,049 and 4,260,676. Toning agents can be incorporated to improve the color of the silver image of photothermographic emulsions as described in U.S. Pat. Nos. 3,846,136; 3,994,732 and 4,021,249. Various methods for producing dye images and multicolor images with photographic color couplers and leuco dyes are well known in the art as represented by U.S. Pat. Nos. 4,022,617; 3,531,286; 3,180,731; 3,761,270; 4,460,681; 4,883,747 and Research Disclosure 29963.

These thermally developable photographic elements in many cases lack desired sensitivity in the blue region of the spectrum, and, accordingly, it is desirable to increase the sensitivity of the emulsions to blue light. It is known that spectral sensitizing dyes can be employed in thermally developable photographic elements to increase spectral sensitivity. It is known, for example from U.S. Pat. Nos. 3,457,075 and 3,761,729, that merocyanine dyes spectrally sensitize thermally developable photographic materials. Polymethine dyes, including merocyanine dyes, are described in GB patents 1,367,417 for spectrally sensitizing heat developable photographic materials free from light sensitive silver salts and containing substantially light insensitive silver salts. Quinoline dyes are described in GB patent 1,409,009 to spectrally sensitize heat developable light-insensitive materials. Merocyanine dyes having at most one sulfo group are described in GB patent 1,466,201 for spectrally sensitizing thermally developable photographic materials.

A common problem that exists with heat developable photographic systems when spectrally sensitized is the instability of the material in the time during storage. In many cases, spectral sensitizing dyes may provide reduced sensitivity and higher minimum density (fog) when stored for one or more months before processing.

Accordingly, there has been a continuing need for thermally developable light-sensitive elements which have increased sensitivity, especially in the blue region of the spectrum, and provide stability during storage before processing.

SUMMARY OF THE INVENTION

According to this invention, the incorporation of a defined class of merocyanine spectral sensitizing dyes to the photothermographic emulsion layer comprising a light-sensitive silver halide enhances the blue sensitivity and provides stability during storage before processing of the photothermographic element.

DETAILED DESCRIPTION OF THE INVENTION

The addition of simple merocyanine spectral sensitizing dyes to a silver halide photothermographic emulsion enhances the blue sensitivity and provides stability during storage before processing of the photothermographic element.

The simple merocyanine spectral sensitizing dyes may be generally represented by the formula I

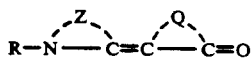

wherein

R represents a saturated or unsaturated aliphatic group which preferably contains up to 4 carbon atoms and which may be substituted (e.g., with halogen, phenyl, hydroxy, carboxyl, sulfo, sulfamoyl, carbamoyl, alkoxycarbonyl, alkoxy, carboxyalkyl or sulfato). Examples of such R groups are methyl, ethyl, propyl, allyl, carboxymethyl, carboxypropyl, sulfopropyl and sulfoethyl.

Z represents the non-metallic atoms necessary to complete a 5-membered heterocyclic nucleus which is a nucleus of the thiazole, selenazole and oxazole class containing in the 4-position an alkyl group preferably containing 1 to 3 carbon atoms (i.e., methyl, ethyl, propyl), an aryl group (e.g., aryl containing 6 to 12 carbon atoms such as phenyl, xylyl, tolyl), a 2-thienyl group, or a 2-furyl group.

Q represents the non-metallic atoms necessary to complete a rhodanine, thiohydantion, or 2-thio-2,4-oxazolidinedione nucleus. The three position of Q preferably has a substituent such as an alkyl group, preferably containing 1 to 3 carbon atoms (i.e., methyl, ethyl or propyl), or a carboxyalkyl group preferably containing 1 to 3 carbon atoms in addition to the carboxyl group carbon atom (e.g., carboxymethyl, carboxyethyl or carboxypropyl).

Preferably, said simple merocyanine spectral sensitizing dyes are represented by the formula II:

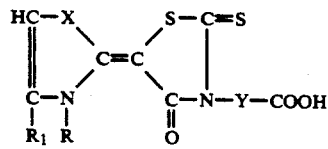

wherein R represents a saturated or unsaturated aliphatic group as described above, X represents O, S or Se, $R_1$ represents an alkyl group, an aryl group, 2-thienyl group or a 2-furyl group as described above, and Y represents a 1 to 3 carbon atom-containing alkylene group.

As it is well understood in this technical area, a large degree of substitution is not only tolerated, but it is often advisable. As means of simplifying the discussion and recitation of these groups, the terms "group" and "moiety" are used to differentiate between chemical species that allow for substitution or which may be substituted. For example, the phrase "alkyl group" is intended to include not only pure hydrocarbon alkyl chains such as methyl, ethyl, octyl, cyclo-hexyl, isooctyl, tert.-butyl and the like, but also such alkyl chains bearing such conventional substituents in the art such as hydroxyl, alkoxy, phenyl, halo (F, Cl, Br, I), cyano, nitro, amino, etc. The phrase "alkyl moiety" on the other hand is limited to the inclusion of only pure hydrocarbon alkyl chains such as methyl, ethyl, propyl, cyclo-hexyl, isooctyl, tert.-butyl, and the like.

Specific examples of the simple merocyanine spectral sensitizing dyes for use in the present invention are shown by the formulae below, which, however, do not limit the description of the dyes to be used in the present invention.

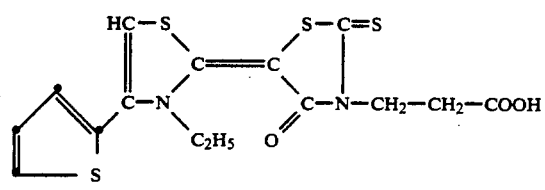

I

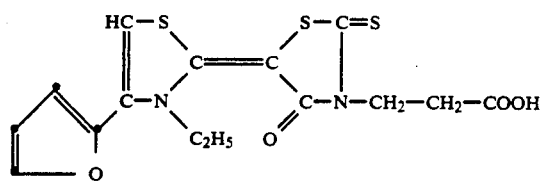

II

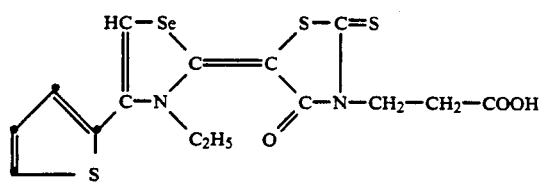

III

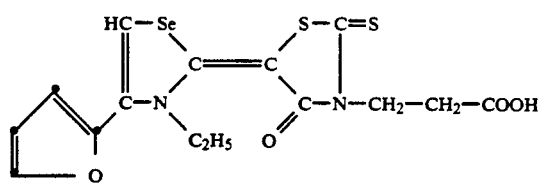

IV

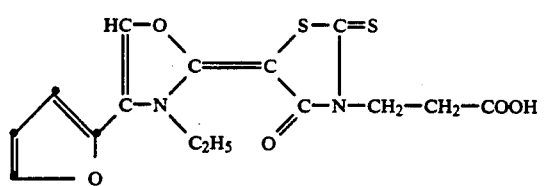

V

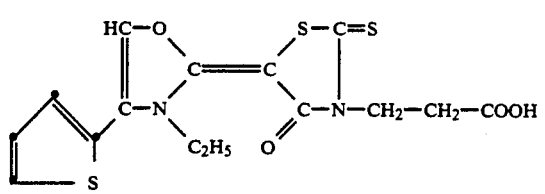

VI

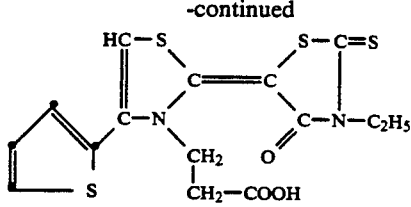

VII

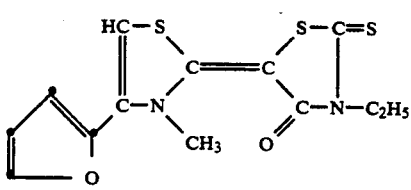

VIII

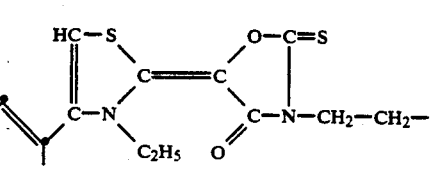

IX

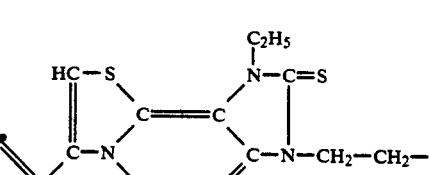

X

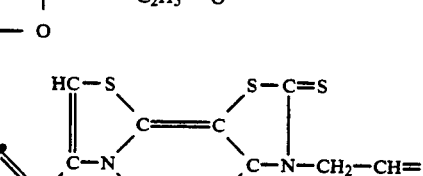

XI

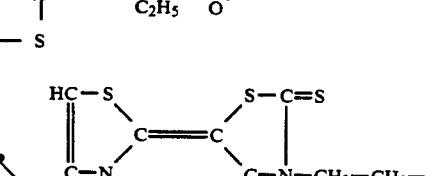

XII

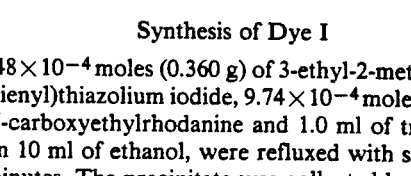

XIII

These exemplified simple merocyanine spectral sensitizing dyes may be readily synthetized by reactions known in the art as shown below.

Synthesis of Dye I $9.48 \times 10^{-4}$ moles (0.360 g) of 3-ethyl-2-methylthio-4-(2-thienyl)thiazolium iodide, $9.74 \times 10^{-4}$ moles (0.200 g) of N-carboxyethylrhodanine and 1.0 ml of triethylamine in 10 ml of ethanol, were refluxed with stirring for 15 minutes. The precipitate was collected by filtration, washed with ethanol and dried under vacuum. The structure was confirmed by NMR.

Synthesis of Dye II $1.38 \times 10^{-3}$ moles (0.487 g) of 3-ethyl-4-(2-furyl)-2-methylthio-thiazolium iodide, $1.46 \times 10^{-3}$ moles (0.300 g) of N-carboxyethylrhodanine and 2.0 of triethylamine in 15 ml of ethanol were refluxed with stirring for one hour. The reaction mixture was poured dropwise in 100 ml of water and cooled. The product was filtered, washed with ethanol and dried under vacuum. The structure was confirmed by NMR.

Synthesis of Dye XIII 0.01 moles (2.87 g) of 3,4-dimethyl-2-methylthio-thiazolium iodide, 0.01 moles (2.05 g) of N-carboxyethylrhodanine and 2.0 ml of triethylamine in 20 ml of methanol were refluxed with stirring for 30 minutes. The precipitate was collected by filtration, washed with methanol and dried under vacuum. The product was crystallized from a 1:1 by volume mixture of methanol:-pyridine. The structure was confirmed by NMR.

The amounts of the above described simple merocyanine spectral sensitizing dyes according to the present invention which are added can be varied depending upon the particular dye used and upon the photothermographic emulsion type. However, they are preferably added in an amount of about 50 mg to about 2.0 grams, and more preferably from about 400 mg to about 1.0 gram, of the described dye per mole of silver halide in the emulsion layer. In these amounts, the described dyes enhance the sensitivity of the silver halide present in the thermally developable photosensitive element and stabilize the element against the loss of sensitivity and the increase of fog occurring during storage before heat processing.

The photothermographic dry silver emulsions of this invention may be constructed of one or more layers on a substrate. Single layer constructions may contain the silver source material, the silver halide, the developer and binder as well as optional additional materials such as toners, coating aids and other adjuvants. Two-layer constructions must contain the silver source and silver halide in one emulsion layer (usually the layer adjacent the substrate) and some of the other ingredients in the second layer of both layers. The spectral sensitizing dyes of the present invention also must be at least in the same layer as the silver halide component.

Multicolor photothermographic dry silver constructions contain sets of these bilayers for each color. Color forming layers are maintained distinct from each other by the use of functional or non-functional barrier layers between the various photosensitive layers as described in U.S. Pat. No. 4,460,681.

The silver source material, as mentioned above, may be any material which contains a reducible source of silver ions. Silver salts of organic acids, particularly long chain (10 to 30, preferably 15 to 28 carbon atoms) fatty carboxylic acids are preferred. Complexes of organic or inorganic silver salts wherein the ligand has a gross stability constant between 4.0 and 10.0 are also desirable. The silver source material constitutes from about 5 to 30 percent by weight of the imaging layer. The second layer in a two layer construction or in the bilayer of a multi-color construction would not affect the percentage of the silver source material desired in the photosensitive single imaging layer.

The organic silver salt which can be used in the present invention is a silver salt which is comparatively stable to light, but forms a silver image when heated to 80° or higher in the presence of an exposed photocatalyst (such as silver halide) and a reducing agent.

Suitable organic silver salts include silver salts of organic compounds having a carboxy group. Preferred examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laureate, silver caprate, silver myristate, silver palmitate, silver maleate, silver fumarate, silver tartarate, silver furoate, silver linoleate, silver butyrate and silver camphorate, mixtures thereof, etc. Silver salts which are suitable with a halogen atom of a hydroxyl group can also be effectively used. Preferred examples of the silver salts of aromatic carboxylic acid and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-di-chlorobenzoate, silver acetamidobenzoate, silver p-phenyl benzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663, etc.

Silver salts of compounds containing mercapto or thione groups and derivatives thereof can be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethylglycolamido)-benzothiazole, a silver salt of thioglycolic acid such as a silver salt of a S-alkyl thioglycolic acid (wherein the alkyl group has from 12 to 22 carbon atoms), as described in JP patent application 28221/73, a silver salt of a dithiocarboxylic acid such as a silver salt of dithioacetic acid, a silver salt of thioamide, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptothiazole derivative such as a silver salt of 3-amino-5-benzylthio-1,2,4-thiazole, a silver salt of a thione compound such as a silver salt of 3-(2-carboxyethyl)-4-methyl-4-thiazoline-2-thione as disclosed in U.S. Pat. No. 3,201,678.

Furthermore, a silver salt of a compound containing an imino group can be used. Preferred examples of these compounds include a silver salt of benzothiazole and a derivative thereof as described in JP patent publications 30270/69 and 18146/70, for example, a silver salt of benzothiazole such as the silver salt of methylbenzotriazole, etc., a silver salt of a halogen substituted benzotriazole, such as a silver salt of a 5-chlorobenzotriazole, etc., a silver salt of 1,2,4-triazole, of 1-H-tetrazole as described in U.S. Pat. No. 4,220,709, a silver salt of imidazole and an imidazole derivative, and the like.

It is also found convenient to use silver halfsoaps, of which an equimolar blend of silver behenate and behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing no more than about 4 or 5 percent of free behenic acid and analyzing about 25.2 percent silver may be used.

The method used for making silver soap dispersions is well known in the art and is disclosed in Research Disclosure April 1983 (22812), ibid October 1983 (23419) and U.S. Pat. No. 3,985,565.

The light sensitive silver halide used in the present invention can be employed in a range of 0.005 mol to 0.5 mol and, preferably, from 0.01 mol to 0.15 mol per mol of organic silver salt.

The silver halide may be any photosensitive silver halide such as silver bromide, silver iodide, silver chloride, silver bromoiodide, silver chlorobromoiodide, silver chlorobromide, etc.

The silver halide used in the present invention may be employed without modification. However, it may be chemically sensitized with a chemical sensitizing agent such as a compound containing sulfur, selenium or tellurium etc., or a compound containing gold, platinum, palladium, rhodium or iridium, etc., a reducing agent such as a tin halide, etc., or a combination thereof. The details of these procedures are described in T. H. James, "*The Theory of the Photographic Process*", 4th edition, chapter 5, pages 149 to 169.

The silver halide may be added to the emulsion layer in any fashion which places it in catalytic proximity to the silver source.

The silver halide and the organic silver salt which are separately formed in a binder can be mixed prior to use to prepare a coating solution, but it is also effective to blend both of them in a ball mill for a long period of time. Further, it is effective to use a process which comprises adding a halogen-containing compound in the organic silver salt prepared to partially convert the silver of the organic silver salt to silver halide. convert the silver of the organic silver salt to silver halide.

Methods of preparing these silver halide and organic silver salts and manners of blending them are described in Research Disclosure no. 170-29, JP patent applications 32928/75 and 42529/76, U.S. Pat. No. 3,700,458 and JP patent applications 13224/74 and 17216/75.

The use of preformed silver halide emulsions of this invention can be unwashed or washed to remove soluble salts. In the latter case the soluble salts can be removed by chill-setting and leaching or the emulsion can be coagulation washed, e.g., by the procedures described in Hewitson et al., U.S. Pat. No. 2,618,556; Yutzky et al., U.S. Pat. No. 2,614,928; Yackel, U.S. Pat. No. 2,565,418; Hart et al., U.S. Pat. No. 3,241,969; and Waller et al., U.S. Pat. No. 2,489,341. The silver halide grains may have any crystalline habit including, but not limited to cubic, tetrahedral, orthohombic, tabular, laminar, platelet, etc.

Photothermographic emulsions containing preformed silver halide in accordance with this invention can be sensitized with chemical sensitizers, such as with reducing agents; sulfur, selenium or tellurium compounds; gold, platinum or palladium compounds, or combinations of these. Suitable chemical sensitization procedures are described in Shepard, U.S. Pat. No. 1,623,499; Waller, U.S. Pat. No. 2,399,083; McVeigh, U.S. Pat. No. 3,297,447; and Dunn, U.S. Pat. No. 3,297,446.

The light-sensitive silver halides can be additionally or separately spectrally sensitized with various known dyes including cyanine, styryl, hemicyanine, oxonol, hemioxonol and xanthene dyes. Useful cyanine dyes include those having a basic nucleus such as a thiazoline nucleus, an oxazoline nucleus, a pyrroline nucleus, a pyridine nucleus, an oxazole nucleus, a thiazole nucleus, a selenazole nucleus and an imidazole nucleus. Useful merocyanine dyes which are preferred include those having not only the above described basic nuclei but also acid nuclei, such as a thiohydrantoine nucleus, a rhodanine nucleus, an oxazolidinedione nucleus, a thiazolidinedione nucleus, a barbituric acid nucleus, a thiazolinone nucleus, a malonitrile nucleus and a pyrazolone nucleus. In the above described cyanine and merocyanine dyes, those having imino groups or carboxyl groups are particularly effective. Practically, the sensitizing dyes to be used in the present invention are properly selected from known dyes as described in U.S. Pat. Nos. 3,761,279; 3,719,495 and 3,877,943, in British patents 1,466,201; 1,469,117 and 1,422,057, in JP patent application (OPI) 27924/76 and 156424/75, and so on, and can be located in the vicinity of the photocatalyst according to known methods used in the above described examples. These spectral sensitizing dyes are used in amounts of about $10^{-4}$ mol to about 1 mol per 1 mol of photocatalyst (silver halide in the same or other silver halide emulsion layers as those with the sensitizers of the present invention).

The reducing agent for silver ion may be any material, preferably organic material, which will reduce silver ion to metallic silver. Conventional photographic developers such as phenidone, hydroquinones, and catechol are useful but hindered phenol reducing agents are preferred. The reducing agent should be present as 1 to 10 percent by weight of the imaging layer. In a two-layer construction, if the reducing agent is in the second layer, slightly high proportions, of from about 2 to 15 percent tend to be more desirable.

A wide range of reducing agents have been disclosed in dry silver systems including amidoximes such as phenylamidoxime, 2-thienylamidoxime and p-phenoxyphenyl-amidoxime, azine, e.g. 4-hydroxy-3,5-dimethoxy-benzaldehyde azine; a combination of aliphatic carboxylic acid aryl hydrazides and ascorbic acid, such as 2,2-bis-(hydroxymethyl)-propionyl-beta-phenyl hydrazide in combination with ascorbic acid; a combination of polyhydroxybenzene and hydroxylamine, a reductone and/or a hydrazine, e.g. a combination of hydroquinone and bis-(ethoxyethyl)-hydroxylamine, piperidinohexose reductone or formyl-4-methylphenyl hydrazine, hydroxamic acids such as phenylhydroxamic acid, p-hydroxyphenyl hydroxamic acid, and beta-alanine hydroxamic acid; a combination of azines and sulfonamidophenols, e.g. phenothiazine and 2,6-dichloro-4-benzene-sulfonamidophenol; alpha-cyanophenylacetic acid and derivatives such as ethyl-alpha-cyano-2-methylphenylacetate, ethyl-alpha-cyanophenylacetate; bis-beta-naphthols as illustrated by 2,2'-dihydroxy-1,1'-bisnaphthyl, 6,6'-dibromo-2,2'-dihydroxy-1,1'-bisnaphtyl, and bis-(2-hydroxy-1-naphthyl)-methane; a combination of bis-beta-naphthol and a 1,3-dihydroxybenzene derivative, e.g. 2,4-hydroxybenzophenone or 2',4'-dihydroxy-acetophenone; 5-pyrazolones such as 3-methyl-1-phenyl-5-pyrazolone; reductones as illustrated by dimethylamino hexose reductone, anhydro dihydro amino hexose reductone, and anhydro dihydro piperidone hexose reductone; sulfonamidophenol reducing agents such as 2,6-dichloro-4-benzensulfonamidophenol, and p-benzenesulfonamidophenol; 2-phenylindane-1,3-dione and the like; chromans such as 2,2-dimethyl-7-t-butyl-6-hydroxychroman; 1,4-dihydropyridines such as 2,6-dimethoxy-3,5-dicarbethoxy-1,4-dihydroxypyridine; bisphenols e.g. bis-(2-hydroxy-3-tert.-butyl-5-methylphenyl)-methane,2,2-bis-(4-hydroxy-3-methylphenyl)-propane, 4-ethylidene-bis-(2-tert.-butyl-6-methylphenol), and 2,2-bis-(3,5-dimethyl-4-hydroxyphenyl)-propane; ascorbic acid derivatives, e.g. 1-ascorbylpalmitate, ascorbylstearate and unsaturated aldehydes and ketones, such as benzyl and diacetyl; 3-pyrazolidones and certain indane-1,3-diones.

The literature discloses additives, such as "toners", which improve the image. The toner materials may be present, for example, in amounts from 0.1 to 10 percent by weight of all silver bearing components. Toners are well known materials in the photothermographic art as shown in U.S. Pat. Nos. 3,080,254; 3,847,612 and 4,123,282.

Examples of toners include phthalimide and N-hydroxyphthalimide; cyclic imides such as succinimide, pyrazoline-5-ones, and a quinazolinone, 3-phenyl-2-pyrazoline-5-one, 1-phenylurazole, quinazoline and 2,4-thiazolidinedione; naphthalimides, e.g. N-hydroxy-1,8-naphthalimide; cobalt complexes, e.g. cobaltic hexamine trifluoroacetate; mecaptans as illustrated by 3-mercapto-1,2,4-triazole, 2,4-dimercaptopyrimidine, 3-mercapto-4,5-diphenyl-1,2,4-triazole and 2,5-dimercapto-1,3,4-thiadiazole; N-(aminomethyl)-aryl-dicarboximides, e.g. (N-dimethylaminomethyl)-phthalimide, and N-(dimethylaminomethyl)-naphthalene-2,3-dicarboximide; and a combination of blocked pyrazoles, isothiouronium derivatives and certain photobleach agents, e.g. a combination of N,N'-hexamethylene bis-(1-carbamoyl-3,5-dimethyl-pyrazole), 1,8-(3,6-diazooctane)-bis-(isothiuronium trifluoroacetate and 2-(tribromomethylsulfonyl benzothiazole); and merocyanine dyes such as 3-ethyl-5-[(3-ethyl-2-benzothiazolinylidene)-1-methylethylindene]-2-thio-2,4-oxazolidinedione; phthalazinone, phthalazinone derivatives or metal salts of these derivatives such as 4-(1-naphthyl)-phthalazinone, 6-chlorophthalazinone, 5,7-dimethoxyphthalazinone, and 2,3-dihydro-1,4-phthalazinedione; a combination of phthalazinone plus sulfinic acid derivatives, e.g. phthalic acid, 4-methylphthalic acid, 4-nitrophthalic acid, and tetrachlorophthalic anhydride; quinazolinediones, benzoxazine or naphthoxazine derivatives; rhodium complexes functioning not only as tone modifiers by also as sources of halide ion for silver halide formation in situ, such as ammonium hexachlororhodate (III), rhodium bromide, rhodium nitrate and potassium hexachlororhodate (III); inorganic peroxides and persulfates, e.g. ammonium peroxydisulfate and hydrogen peroxide; benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidines and asym-tri-azines, e.g. 2,4-dihydroxypyrimidine, 2-hydroxy-4-aminopyrimidine, and azauracil, and tetrazapentalene derivatives, e.g. 3,6-mercapto-1,4-diphenyl-1H,4H-2,3a,5,6a-tetrazapentalene, and 1,4-di-(o-chloro-phenyl)-3,6-dimercapto-1H,4H-2,3a,5,6a-tetrazapentalene.

A number of methods have been proposed for obtaining color images with dry silver systems. Such methods include incorporated coupler materials, e.g., a combination of silver benzotriazole, well known magenta, yellow and cyan dye-forming couplers, aminophenol developing agents, a base release agent such as guanidinium trichloroacetate and silver bromide in poly(vinylbutyral); a combination of silver bromoiodide, sulfonamidophenol reducing agent, silver behenate; poly(vinylbutyral), an amine such as n-octadecylamine and 2-equivalent or 4-equivalent cyan, magenta or yellow dye-forming couplers; incorporating leuco dye bases which oxidizes to form a dye image, e.g., Malachite Green, Crystal Violet and pararosaniline; a combination of in situ silver halide, silver behenate, 3-methyl-1-phenyl-pyrazolone and N,N-dimethyl-p-phenylenediamine hydrochloride; incorporating phenolic leuco dye reducing agents such as 2-(3,5-ditert.-butyl-4-hydroxyphenyl)-4,5-diphenylimidazole, and bis-(3,5-ditert.-butyl-4-hydroxyphenyl)-phenylmethane, incorporating azomethine dyes or azo dye reducing agents; silver dye bleach process, e.g., an element comprising silver behenate, behenic acid, poly(vinylbutyral), poly(vinylbutyral)-peptized silver bromo-iodide emulsion, 2,6-dichloro-4-benzenesulfonamidophenol, 1,8-(3,6-diazaoctane)-bis-isothiouronium-p-toluene sulfonate and an azo dye was exposed and heat processed to obtain a negative silver image with a uniform distribution of dye which was laminated to an acid activator sheet comprising polyacrylic acid, thiourea and p-toluene sulfonic acid and heated to obtain well defined positive dye images; and incorporating amines such as amino acetanilide (yellow dye-forming), 3,3'-dimethoxybenzidine (blue dye-forming) or sulfanilanilide (magneta dye-forming) which react with the oxidized form of incorporated reducing agents such as 2,6-dichloro-4-benzene-sulfonamido-phenol to form dye images. Neutral dye images can be obtained by the addition of amines such as behenylamine and p-anisidine.

Leuco dye oxidation in such silver halide systems is disclosed in U.S. Pat. Nos. 4,021,240; 4,374,821; 4,460,681 and 4,883,747.

Silver halide emulsions containing the stabilizers of this invention can be protected further against the additional production of fog and can be stabilized against loss of sensitivity during keeping. Suitable anti-foggants and stabilizers which can be used alone or in combination, include the thiazolium salts as described in Staud, U.S. Pat. No. 2,131,038 and Allen U.S. Pat. No. 2,694,716; the azaindenes described in Piper, U.S. Pat. No. 2,886,437 and Heimbach, U.S. Pat. No. 2,444,605; the mercury salts described in Allen U.S. Pat. No. 2,728,663; the urazoles described in Anderson, U.S. Pat. No. 3,287,135; the sulfocatechols described in Kennard, U.S. Pat. No. 3,235,652; the oximes described in Carrol et al., GB patent 623,448; nitron; nitroindazoles; the polyvalent metal salts described in Jones, U.S. Pat. No. 2,839,405; the thiouronium salts described by Herz, U.S. Pat. No. 3,220,839; and palladium, platinum and gold salts described in Trivelli, U.S. Pat. No. 2,566,263 and Damschroder, U.S. Pat. No. 2,597,915.

Stabilized emulsions of the invention can contain plasticizers and lubricants such as polyalcohols, e.g., glycerin and diols of the type described in Milton, U.S. Pat. No. 2,960,404; fatty acids or esters such as those described in Robins, U.S. Pat. No. 2,588,765 and Duane, U.S. Pat. No. 3,121,060; and silicone resins such as those described in DuPont GB patent 955,061.

The photothermographic elements can include image dye stabilizers. Such image dye stabilizers are illustrated by GB patent 1,326,889; Lestina et al. U.S. Pat. Nos. 3,432,300 and 3,698,909; Stern et al. U.S. Pat. No. 3,574,627; Brannock et al. U.S. Pat. No. 3,573,050; Arai et al. U.S. Pat. No. 3,764,337 and Smith et al. U.S. Pat. No. 4,042,394.

Photothermographic elements containing emulsion layers stabilized according to the present invention can be used in photographic elements which contain light absorbing materials and filter dyes such as those described in Sawdey, U.S. Pat. No. 3,253,921; Gaspar U.S. Pat. No. 2,274,782; Carrol et al. U.S. Pat. No. 2,527,583 and Van Campen, U.S. Pat. No. 2,956,879. If desired, the dyes can be mordanted, for example, as described in Milton and Jones, U.S. Pat. No. 3,282,699.

Photothermographic elements containing emulsion layers stabilized as described herein can contain matting agents such as starch, titanium dioxide, zinc oxide, silica, polymeric beads including beads of the type described in Jelley et al., U.S. Pat. No. 2,992,101 and Lynn, U.S. Pat. No. 2,701,245.

Emulsions stabilized in accordance with this invention can be used in photothermographic elements which contain antistatic or conducting layers, such as layers that comprise soluble salts, e.g., chlorides, nitrates, etc., evaporated metal layers, ionic polymers such as those described in Minsk, U.S. Pat. Nos. 2,861,056, and 3,206,312 or insoluble inorganic salts such as those described in Trevory, U.S. Pat. No. 3,428,451.

The binder may be selected from any of the well-known natural or synthetic resins such as gelatin, polyvinyl acetals, polyvinyl acetate, cellulose acetate, polyolefins, polyesters, polystyrene, polyacrylonitrile, polycarbonates, and the like. Copolymers and terpolymers are of course included in these definitions. The preferred photothermographic silver containing polymer is polyvinyl butyral, butylethyl cellulose, methacrylate copolymers, maleic anhydride ester copolymers, polystyrene, and butadiene-styrene copolymers.

Optionally, these polymers may be used in combination of two or more thereof. Such a polymer is used in an amount sufficient to carry to components dispersed therein, that is, within the effective range of the action as the binder. The effective range can be appropriately determined by one skilled in the art. As a guide in the case of carrying at least an organic silver salt, it can be said that a preferable ratio of the binder to the organic silver salt ranges from 15:1 to 1:2, and particularly from 8:1 to 1:1.

Photothermographic emulsions containing the stabilizer of the invention can be coated on a wide variety of supports. Typical supports include polyester film, subbed polyester film, poly(ethylene terephthalate) film, cellulose nitrate film, cellulose ester film, poly(vinyl acetal) film, polycarbonate film and related or resinous materials, as well as glass, paper, metal, and the like. Typically, a flexible support is employed especially a paper support, which can be partially acetylated or coated with baryta and/or an alphaolefin polymer, particularly a polymer of an alpha-olefin containing 2 to 10 carbon atoms such as polyethylene, polypropylene, ethylenebutene copolymers and the like.

The substrate with backside resistive heating layer may also be used in color photothermographic imaging systems such as shown in U.S. Pat. Nos. 4,460,681 and 4,374,921.

Photothermographic emulsions of this invention can be coated by various coating procedures including dip coating, air knife coating, curtain coating, or extrusion coating using hoppers of the type described in Benguin, U.S. Pat. No. 2,681,294. If desired, two or more layers may be coated simultaneously by the procedures described in Russell, U.S. Pat. No. 2,761,791 and Wynn, GB patent 837,095.

The present invention will be illustrated in detail with reference to the following examples, but the embodiment of the present invention is not limited thereto.

EXAMPLE 1

A dispersion of silver behenate half soap was made at 10% solids in toluene and ethanol by homogenization. To 153.9 g of this silver half soap dispersion was added 253.3 g methyl ethyl ketone, 115.16 g isopropyl alcohol and 0.74 g of polyvinylbutyral. After 15 minutes of mixing, 5 ml of mercuric bromide (0.36 g/10 ml ethanol) were added. Then 10.0 ml of calcium bromide (0.236 g/10 ml ethanol) was added 30 minutes later. After three hours of mixing, 25.72 g of polyvinylpyrolidone was added, and 34.3 g of polyvinylbutyral was added one hour later.

To 4.19 g of the prepared silver premix described above was added 0.0051 mmole of the sensitizing dye A shown below.

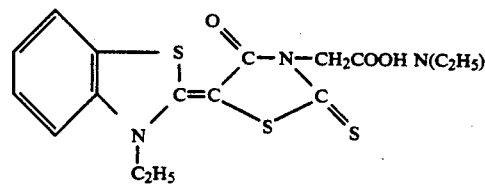

After 20 minutes, 0.95 ml of a yellow color-forming leuco dye solution was added as shown below.

| Component | Amount |
|---|---|
| Leuco Dye B | 0.424 g |
| Tribenzylamine | 0.392 g |
| Phthalazinone | 0.254 g |
| iso-Propanol | 4.46 g |
| Toluene | 4.46 g |

The leuco dye B is disclosed in U.S. Pat. No. 4,883,747 and has the following formula:

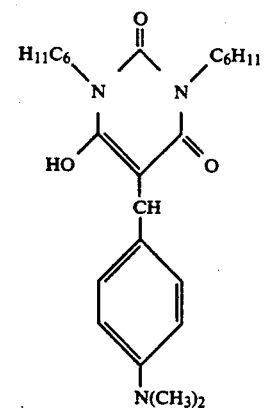

After sensitization with the dye and the addition of the leuco base dye solution, the resulting solution was coated at a wet thickness of 3 mils (0.076 mm) and dried at 82° C. for 5 minutes onto a polyester base. A topcoat solution, as shown below, was coated at a wet thickness of 3 mils (0.076 mm) and dried at 82° C. for 5 minutes over the silver halide layer.

| Component | Amount |
|---|---|
| Polyvinyl alcohol | 51.14 g |
| Water | 324.85 g |
| Methanol | 317.40 g |
| Phthalazine | 0.418 g |
| Benzotrazole | 0.014 g |
| Sodium acetate | 2.45 g |

Other samples were obtained as above, but using Dyes I and II instead of Dye A in amounts of 0.0051 mMoles or 0.0204 mMoles to 4.19 g aliquot of the yellow coating solution.

The samples were exposed to a blue light for $10^{-3}$ seconds through a 47B Wratten filter and a 0 to 3 continuous wedge and developed by heating to approximately 138° C. for 5 seconds.

The density of the dye for each sample was measured using a blue filter of a computer densitometer. The initial sensitometric data are shown below:

| | Dmin | Dmax | Speed[1] |
|---|---|---|---|
| Control | 0.12 | 2.55 | 1.43 |
| 0.0051 mMoles I | 0.12 | 2.69 | 1.19 |
| 0.0204 mMoles I | 0.16 | 2.62 | 1.81 |
| 0.0051 mMoles II | 0.11 | 2.70 | 1.62 |
| 0.0204 mMoles II | 0.15 | 2.75 | 1.35 |

[1]Log exposure corresponding to density of 0.6 above Dmin.

EXAMPLE 2

A two color formulation was tested with Dyes I and II. To 4.19 g of the yellow silver halide dispersion described in Example 1 was added 0.0051 mMoles of Dye I or 0.0204 mMoles of Dye II. The resulting solutions and a silver halide dispersion sensitized with 0.0051 mMoles of Dye A were each coated with a topcoat as described in Example 1. In addition to the yellow silver halide layer and the topcoat layer, a third coating solution was prepared using 502 g of the silver half soap dispersion of Example 1 and adding 0.2 g of polyvinylbutyral. After 15 minutes of mixing, a 0.5 g/9.76 g mercuric acetate in methanol solution and a 0.55 g/18.40 g calcium bromide in methanol solution were added 30 minutes later. After one hour of mixing, 49.8 g of polyvinylbutyral was added.

To 21.8 g of the prepared silver premix described above was added 0.88 ml of the sensitizing dye C (17.0 mg/50 ml of ethanol) shown below.

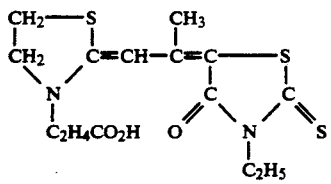
C)

After 30 minutes, 37.56 g of a magenta color-forming leuco dye D solution was added as shown below.

| Component | Amount |
|---|---|
| Leuco Dye D | 0.329 g |
| Phthalazinone | 0.549 g |
| Tetrahydrofuran | 14.52 g |
| VAGH (Union Carbide) | 1.32 g |

| Component | Amount |
|---|---|
| Polyvinylbutyral | 6.23 g |

The leuco dye D is disclosed in U.S. Pat. No. 4,795,697 and has the formula:

$$\left[ \begin{array}{c} H_3CO \\ HO \end{array} \hspace{-0.5em} \begin{array}{c} \\ \\ OCH_3 \end{array} \hspace{-0.5em} C\!=\!N\!-\! \\ \hspace{2em} C_2H_5 \end{array} \right]_2 \quad D)$$

A fourth layer topcoat solution was prepared as shown below.

| Component | Amount |
|---|---|
| Polystyrene | 137.82 g |
| Toluene | 221.79 g |
| Methylethyl ketone | 221.79 g |

The third and fourth layers were coated simultaneously onto the yellow top coat at 2 mils (0.051 mm) wet thickness, respectively, and dried 5 minutes at 82° C. The samples were exposed and processed as described in Example 1. Then, samples of the yellow/magenta bipacks were packaged in black bags and aged for one and three months at 22° C. and 50% relative humidity, then exposed and developed. The sensitometric data are shown below.

| | Dmin | | | Speed[1] | | |
|---|---|---|---|---|---|---|
| | Init. | 1 month | 3 months | Init. | 1 month | 3 months |
| Control | 0.17 | 0.35 | 1.15 | 1.58 | 0.98 | −0.18 |
| Dye I | 0.17 | 0.22 | 0.31 | 1.56 | 2.21 | 1.11 |
| Dye II | 0.18 | 0.23 | 0.29 | 1.36 | 1.08 | 1.06 |

The results show an improvement of 72% in Dmin increase with both dyes I and II versus the control dye A after 1 month storage, and an improvement of 68% and 89% in Dmin increase with Dyes I and, respectively, II versus the control dye A after three months storage.

EXAMPLE 3

To 4.19 g of the yellow silver coating solution similar to Example 1, was added 0.0051 mMoles or 0.0204 mMoles of dye XIII in 2.5 ml of toluene and 2.5 ml of methanol. The resulting solution was coated along with a solution added with 0.0051 mMoles of dye A as described in Example 1. The topcoat was coated over each yellow silver layer as described in Example 1. The samples were exposed and processed as described in Example 1. The initial sensitometric data is shown below.

| | Dmin | Dmax | Speed[1] |
|---|---|---|---|
| Control | 0.12 | 2.55 | 1.43 |
| 0.0051 mMoles XIII | 0.12 | 2.54 | 1.99 |

-continued

|  | Dmin | Dmax | Speed[1] |
|---|---|---|---|
| 0.0204 mMoles XIII | 0.18 | 2.48 | 1.63 |

[1]Log exposure corresponding to density of 0.6 above Dmin.

A magenta silver layer and topcoat were coated as third and fourth layers on each yellow silver layer and topcoat and are described in Example 2. The samples were exposed and processed as described in Example 2. The sensitometric data are shown below.

|  | Dmin | | | Speed[1] | | |
|---|---|---|---|---|---|---|
|  | Init. | 1 month | 3 months | Init. | 1 month | 3 months |
| Control | 0.17 | 0.35 | 1.15 | 1.58 | 0.98 | −0.18 |
| 0.0204 mMol Dye XIII | 0.20 | 0.29 | 1.39 | 1.79 | 1.60 | 1.68 |

The results show an improvement of 50% and 81% in Dmin increase with dye XIII versus the control dye A after 1 month and, respectively, 3 months of storage, and an improvement of 68% and 94% in speed decrease with dye XIII versus the control dye A after 1 month and, respectively, 3 months of storage.

We claim:

1. A photothermographic imaging element comprising a substrate having on at least one side thereof a layer comprising a photographic silver halide in reactive association with a silver source material, a reducing agent for silver ion, and a binder, said layer having therein a merocyanine spectral sensitizing dye represented by the formula:

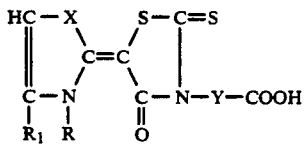

wherein R represents a saturated or unsaturated aliphatic group, X represents O, S or Se, $R_1$ represents an alkyl, aryl, 2-thienyl or 2-furyl group, and Y represents a 1 to 3 carbon atom-containing alkylene group.

2. The element of claim 1 wherein said merocyanine spectral sensitizing dye is present in said element in an amount of from 50 mg to 2.0 g dye per mole of silver halide in said element.

3. The element of claim 1 wherein said merocyanine spectral sensitizing dye is represented by the formula:

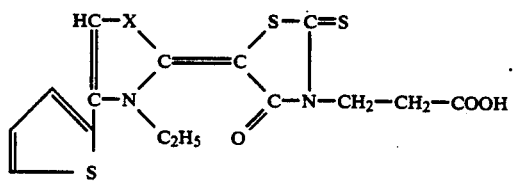

4. The element of claim 1 wherein said merocyanine spectral sensitizing dye is represented by the formula:

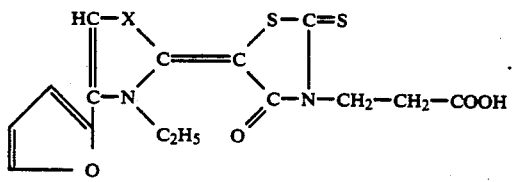

5. The element of claim 1 wherein said merocyanine spectral sensitizing dye is represented by the formula:

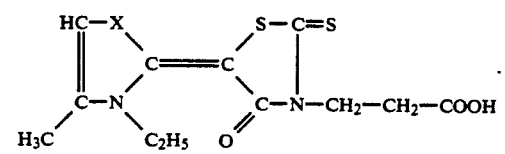

6. The element of claim 1 wherein said silver source material is a silver salt of a long-chain fatty acid containing 10 to 30 carbon atoms.

7. The element of claim 1 wherein said silver source material comprises silver behenate.

8. The element of claim 1 wherein said binder comprises poly(vinylbutyral).

* * * * *